United States Patent [19]
Jenkins et al.

[11] Patent Number: 6,097,549
[45] Date of Patent: Aug. 1, 2000

[54] BIREFLECTIVE LENS ELEMENT

[75] Inventors: David Jenkins; Robert Pagano; Marie Cote, all of Tuscon, Ariz.; Joseph A. Griffin, White Lake, Mich.

[73] Assignee: Breault Research Organization, Inc., Tucson, Ariz.

[21] Appl. No.: 09/133,178

[22] Filed: Aug. 12, 1998

Related U.S. Application Data

[60] Provisional application No. 60/055,240, Aug. 12, 1997.

[51] Int. Cl.[7] .............................. G02B 17/00; F21V 5/00; F21V 7/00
[52] U.S. Cl. ......................... 359/726; 362/459; 362/517; 362/520
[58] Field of Search ..................................... 359/726, 732, 359/730, 731, 725; 362/293, 321, 294, 459, 517–522

[56] References Cited

U.S. PATENT DOCUMENTS

| | | | |
|---|---|---|---|
| 4,037,096 | 7/1977 | Brendgord et al. | 240/1.4 |
| 5,046,805 | 9/1991 | Simon | 385/31 |
| 5,197,792 | 3/1993 | Jiao et al. | 362/31 |
| 5,365,412 | 11/1994 | Koppolu et al. | 362/32 |
| 5,434,754 | 7/1995 | Li et al. | 362/31 |
| 5,490,049 | 2/1996 | Montalan et al. | 362/240 |
| 5,594,424 | 1/1997 | Louy et al. | 340/815.54 |
| 5,676,453 | 10/1997 | Parkyn, Jr. et al. | 362/260 |

FOREIGN PATENT DOCUMENTS

| | | |
|---|---|---|
| 2558237 | of 1984 | France . |
| 9507234 | of 1995 | Germany . |

OTHER PUBLICATIONS

TIR Technologies, Inc., "Linear TIR Lenses For Fluorescent Light Sources", 1994, pp. 1–9.

*Primary Examiner*—Scott J. Sugarman
*Attorney, Agent, or Firm*—Howard & Howard

[57] ABSTRACT

A bireflective lens element comprising a light input surface and a direct transmitting area communicating with the light input surface. A light source is disposed adjacent to the light input surface for projecting light into the lens element to create a light emitting assembly. A first portion of input light is directed through the lens elements in a first predetermined pattern. A primary and a secondary reflecting area is between the light input surface and an illumination surface surrounding the direct light transmitting area. A second portion of input light is redirected through the lens element to the illumination surface in a second predetermined pattern. Specifically, the secondary reflective area has a plurality of extracting facets extending inwardly into the secondary reflective area for intercepting light from the primary reflective area. The first predetermined pattern combines with the second predetermined pattern to output light from the illumination surface in a substantially uniform pattern covering the broad area of the lens element.

32 Claims, 4 Drawing Sheets

BIREFLECTIVE LENS ELEMENT

RELATED APPLICATION

This patent application claims priority to and all the benefit of U.S. Provisional Patent Application No. 60/055,240, filed on Aug. 12, 1997 and entitled "Bireflective Lens Element".

TECHNICAL FIELD

The subject invention relates to a thin light emitting assembly, and more particularly, to a thin bireflective lens which achieves efficient and uniform surface illumination with only a single light source and the lens element.

BACKGROUND OF THE INVENTION

Conventional light emitting assemblies for automotive vehicle headlights, sidelights and taillights typically include a bulb filament recessed in a reflector housing behind a cover lens. The light emitted from the bulb filament is reflected from the reflector housing outwardly through the cover lens to form a beam or planar light image. The cover lens shapes the light into the desired pattern, i.e. focused headlight beam or pattern side or rear signal. However, conventional bulb and reflector lighting systems are disadvantageous in terms of styling and size flexibility. The bulb and reflector require a significant depth and width to acquire desired focus and light dispersion through the cover lens, thus, limiting the ability to streamline and contour the light system.

Other systems have been developed to provide alternatives to the conventional bulb filament and reflector system utilizing a light pipe and collimator to direct the light to a reflective emitter having a plurality of lens facets to redirect the light in the desired path and a pattern. One such system is exemplified in U.S. Pat. No. 5,197,792 to Jiao et al., issued Mar. 30, 1993.

The Jiao et al. '792 patent, however, has a number of deficiencies. One such deficiency is the lighting design creates a "black" area or shadow in the middle of the lens. This is created because light is not permitted to travel through a deflector which is mounted to the center of the assembly. Other deficiencies are that the design is not rotationally symmetric, and not easily compatible with a light emitting diode.

SUMMARY OF THE INVENTION AND ADVANTAGES

The subject invention is a bireflective lens element comprising a light input surface and a direct transmitting area communicating with the light input surface. A first portion of input light is directed through the lens elements in a first predetermined pattern. A primary and a secondary reflecting area is between the light input surface and an illumination surface surrounding the direct light transmitting area. A second portion of input light is redirected through the lens element to the illumination surface in a second predetermined pattern.

The subject invention also incorporates a light source adjacent to the light input surface for projecting light into the lens element which creates a light emitting assembly.

Further, the subject invention includes the secondary reflective area having a plurality of extracting facets extending inwardly into the secondary reflective area for intercepting light from the primary reflective area. The facets each include a substantially parabolic surface for redirecting light from the primary reflective area outwardly away from the bireflective lens element to the illumination surface.

Accordingly, the subject invention incorporates the advantages of a thin light emitting assembly while eliminating any "black" area or shadow within the lens. Further the subject invention incorporates a novel design for the facets to assist in redirecting the light from a light source toward the illumination surface.

BRIEF DESCRIPTION OF THE DRAWINGS

Other advantages of the present invention will be readily appreciated as the same becomes better understood by reference to the following detailed description when considered in connection with the accompanying drawings wherein.

DETAILED DESCRIPTION OF THE PREFERRED EMBODIMENT

For convenience in the following description, various directional or other spatial references are made with regard to the orientation of structure(s) shown in the drawings. It is understood, however, that such references, including, without limitation, upper, lower, top, bottom, front, back, left, right, vertical, horizontal, lateral, or longitudinal, are made for convenience only and should not necessarily be construed to be limiting on the invention described herein.

Figure 1:
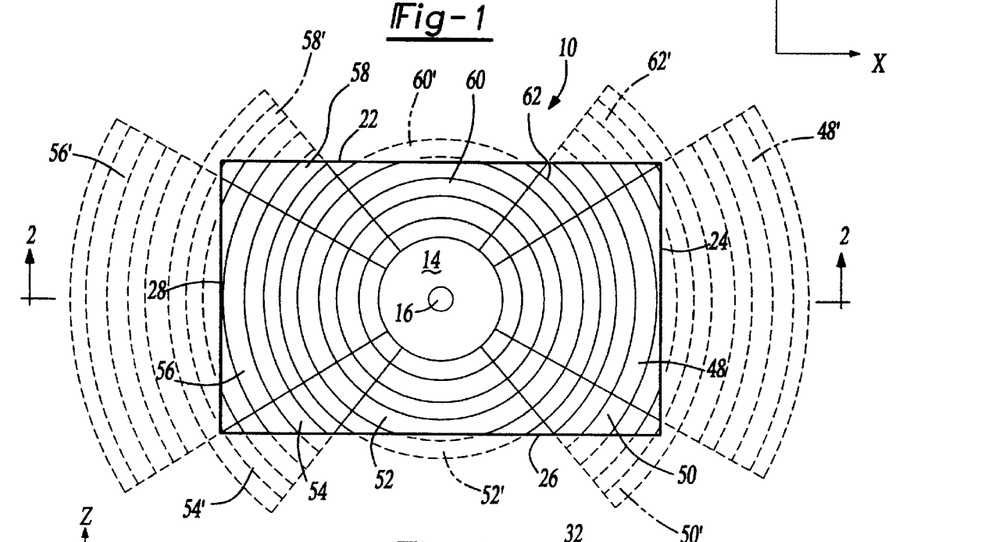
FIG. 1 is a plan view of a bireflective lens element according to the present invention showing a central primary reflective area and eight discreet secondary reflective areas surrounding the central primary reflective area as well as virtual portions of the secondary reflective areas shown in phantom lines.
Figure 2:
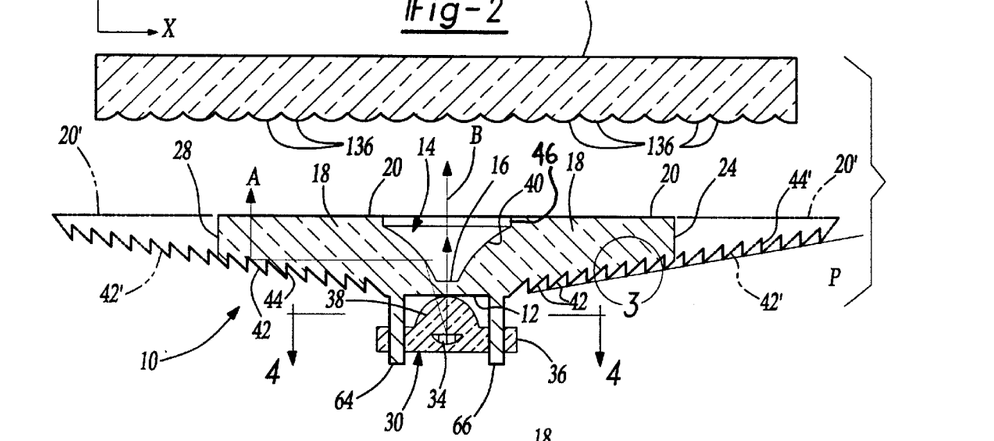
FIG. 2 is a cross-section of the lens element of FIG. 1 taken through the line 2—2 with a cross-section of a pillow lens added as an enhancement to the bireflective lens element of the present invention.

A bireflective lens element according to the present invention is generally designated by reference number 10 in FIGS. 1 and 2. Lens element 10 includes a light input surface 12, a primary reflective area 14, preferably having a direct light transmitting area 16 centrally located therein, a secondary reflective area 18 surrounding primary reflective area 14, an illumination, or output, surface 20, and edges 22, 24, 26, and 28.

The bireflective lens element of the present invention is preferably molded of an optic quality plastic, such as acrylic/PMMA or a polycarbonate.

The function of lens element 10 is to take light emitted from a single light source, such as a light emitting diode ("LED") structure generally indicated at 30, and redirect the light so that the light is emitted from the illumination surface 20 in a direction substantially normal to the surface 20. Specifically, a first portion of input light passes through the direct light transmitting area 16 of the lens element 10 in a first predetermined pattern. A second portion of input light is redirected through the lens element 10 to the illumination surface 20 in a second predetermined pattern. More specifically, the second portion of input light is emitted through the light input surface to the primary reflection area which redirects the input light toward the secondary reflective area. The input light is then redirected again from the secondary reflective area toward the illumination surface. The first predetermined pattern combines with the second predetermined pattern to output light in a substantially uniform or desired pattern.

This surface illumination may be accomplished by an ultra thin lens element. Angular spreading of the light emitted from surface 20 may be accomplished by another optical element, such as an array of pillow lenses, designated generally by reference number 32 as shown in FIG. 2 and further described hereinbelow.

Figure 4:
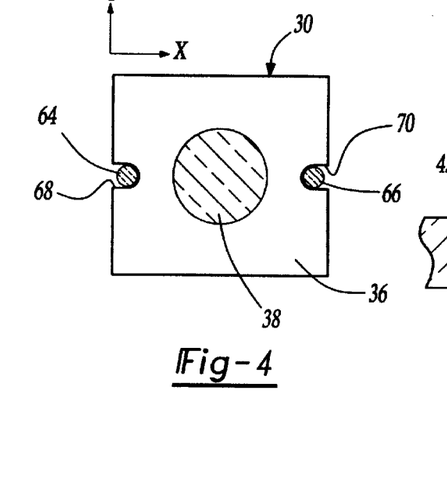
FIG. 4 is a cross-sectional view in the direction indicated by line 4—4 in FIG. 2 showing a light emitting diode structure and mounting posts of the bireflective lens element according to the present invention.

As shown in FIGS. 2 and 4, the light source 30 is shown as a conventional LED structure, which includes an LED 34 and associated electrical leads (not shown) encapsulated in an epoxy body structure which comprises base portion 36 and domed portion 38. The domed portion 38 may be tailored so as to achieve specific output characteristics.

It will be apparent to those skilled in the art that the LED or LED's may be mounted on a carrier (not shown) that provides support and mounting structure for the LED (s) and may also include circuitry for powering and controlling the LED(s).

As shown in FIG. 2, the primary reflective area 14 comprises a primary reflective surface 40, preferably in the form of a revolved curved or generally parabolic surface, and secondary reflective area 18 comprises a plurality of extracting facets 42 and adjacent step downs 44. More specifically, the secondary reflective area 18 includes a plurality of facets 42 extending inwardly into the second reflective area 18 for intercepting light from the primary reflective area 14 and redirecting the light toward the illumination surface 20.

As represented schematically by the arrow designated by reference letter "A", the lens element 10 takes light from the light source 30 which enters through the input surface 12 on the back side of the element 10 and reflects the light by total internal reflection off the primary reflective surface 40 toward the plurality of extracting facets 42 of the secondary reflective area 18. The primary reflective surface 40 redirects light in a direction that is radially outward and generally parallel to the output surface 20. From the extracting facets 42, the light is again reflected by total internal reflection toward the illumination surface 20 of the element 10.

Figure 3:
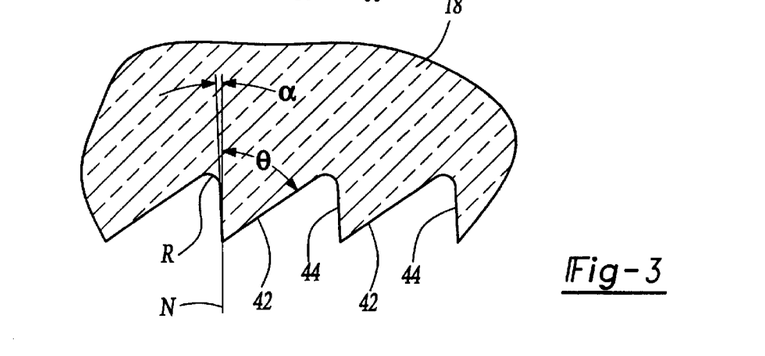
FIG. 3 is an enlarged view of the area within the circle 3 in FIG. 2.

As shown in FIG. 3, each extracting facet 42 is preferably oriented at an angle θ=45° with respect to a normal "N" to the output surface 20 so that extracted light is substantially normal to the surface 20. The twice-reflected light which is emitted from the illumination surface 20 is thus substantially collimated.

The primary reflective area 14 preferably includes a peripheral step down 46 extending about the perimeter of the revolved primary reflective surface 40. This step down 46 may be formed with a small draft angle to facilitate molding.

Details of the preferred embodiment of the extracting facets 42 and step downs 44 of the secondary reflective area 18 are shown in FIG. 3. As mentioned above, the extracting facets 42 can be formed by multiple sets of 45° facets and associated step downs 44 that are revolved about a common axis extending through the center of the primary reflective area 14. The common axis about which the facets 42 and step downs 44 are revolved is the optical axis of the lens element 10.

The facets 42 can be designed with the step downs 44 tilted slightly away from normal "N" by a draft angle α. The draft angle α provides relief to facilitate removal of the element from a mold and may be of almost any value although it is presently contemplated to employ a draft angle α of about 5°. The step downs interconnect a trailing edge of a facet to a leading edge of an adjoining facet.

In the embodiment shown, the step downs 44 are sized and oriented so that the faceted profile starts from an-outside edge of the flat portion of the input surface 12 and would extend to the illumination surface 30 had the element 10 not been truncated at edges 24 and 28. This design feature is shown in FIG. 2 in phantom as a "virtual" secondary reflective area having extracting facets 42' and associated step downs 44' which extend to the virtual illumination surface 20'.

As shown by the reference line labelled "P" the step downs 44 and 44' and facets 42 and 42' are oriented along a linear base profile. Curved base profiles, such as concave or convex profiles, however, can also be used.

Because light contacting the primary reflective surface 40 is redirected laterally toward the extracting facets 42, it can be appreciated that the output of the lens 10 will be defined by illumination surface 20 with a dark circular portion in the middle thereof due to the shadow cast by primary reflective area 14. To minimize the shadowing caused by the primary reflective area 14, it is preferred that direct transmitting area 16 be provided at the center of the primary reflective area 14. As shown by the arrow generally designated by reference letter "B", light transmitted from the light source 30 which enters through the input surface 12 and contacts the direct transmitting area 16 is transmitted directly through the lens element 10, thus providing illumination in the shadow region of the primary reflective area 14 and providing a substantially uniform or broad area of illumination of the lens element 10.

Direct transmitting area 16 is preferably a flat area defining the base of the primary reflective surface 40 but may comprise a hole formed through the center of the primary reflective area 14 or some type of directly transmitting lens structure, such as a concave, convex, or fresnel lens. The lens structure collimates light directly through the lens element.

The secondary reflective area 18 may be defined by a set of extracting facets 42 and associated facet step downs 44 revolved 360° about the primary reflective area 14, and the shape of the lens element 10 may be rectangular of any aspect ratio, square, round, or some other shape. In the preferred embodiment of the present invention, the shape of the element 10 is rectangular with the longer dimension defining a longitudinal direction and the shorter dimension defining a transverse direction.

To create a lens element 10 with a rectangular shape, the extracting facets are divided into discreet pie-shaped regions, or sectors, each of which comprises a truncated revolved arc. In the presently preferred embodiment, eight discreet sectors, progressing clockwise in FIG. 1 from the far right, 48, 50, 52, 54, 56, 58, 60, and 62, are provided as farther described below.

The element 10 shown in FIG. 1 has a right side secondary reflective area 48. In addition, virtual right side reflective area 48' is shown in phantom to show the extent to which reflective area 48 would extend if the facet profile were permitted to extend from the input surface 12 out to the virtual illumination surface 20' (see FIG. 2). Virtual illumination surface 20' is a virtual extension of actual illumination surface 20.

Similarly, a left side secondary reflective area is generally designated by reference number 56 and the associated virtual left side reflective area is shown in phantom and generally designated by reference number 56'.

Upper secondary reflective area and the associated virtual upper secondary reflective area are designated by reference numbers 60 and 60', respectively. Lower secondary reflective area and the associated virtual lower secondary reflective area are generally designated by reference numbers 52 and 52', respectively.

The upper right secondary reflective area and the associated virtual upper right secondary reflective area are generally designated by reference numbers 62 and 62', respectively. The lower right secondary reflective area and the associated virtual lower right secondary reflective area are generally designated by reference numbers 50 and 50', respectively.

The upper left secondary reflective area and the associated virtual upper left secondary reflective area are generally designated by reference numbers 58 and 58', respectively. Finally, the lower left secondary reflective area and the associated virtual lower left secondary reflective area are generally designated by reference numbers 54 and 54', respectively.

For each discreet secondary reflective area, the associated virtual reflective area represents the extent to which that reflective area would extend radially outwardly to the virtual illumination surface 20' if the facet profile were not truncated at an edge of the lens element 10.

As can be appreciated from FIG. 1, the lens element 10 is preferably symmetrical about vertical and horizontal axes extending through its center. That is, right side secondary reflective area 48 is a mirror image of left side secondary reflective area 56, upper secondary reflective area 60 is a mirror image of lower secondary reflective area 52, and the upper right 62, lower right 50, upper left 58, and lower left 54 secondary reflective areas are all mirror images of one another.

It can also be appreciated from FIG. 1, as represented by the associated virtual secondary reflective areas, that the slope of the facet profile varies among the discreet secondary reflective regions. For example, right virtual secondary reflective area 48' extends further radially outwardly then upper right and lower right virtual secondary reflective areas 62' and 50', respectively, which extend further radially outwardly than upper and lower virtual secondary reflective areas 60' and 52', respectively. Thus, the slope of the facet profile of the upper and lower secondary reflective areas 60 and 52, respectively, is steeper than that of the remaining secondary reflective areas, and the slope of the facet profile of the upper right, lower right, upper left, and lower left secondary reflective areas, 62, 50, 58, and 54, respectively, is steeper than the slope of the facet profile of the left and right secondary reflective areas 56 and 48, respectively, but is shallower than the facet profile slope of the upper and lower secondary reflective areas 60 and 52, respectively.

As the angle θ of the reflecting facet is preferably 45° and the draft angle α is preferably about 5°, the profile of the secondary reflecting area is changed by varying the length of individual step downs 44, although the length of individual facets 42 may also be varied if desired.

The uniformity of the surface illumination from the illumination surface 20 is dependent upon the input light being symmetrically directed about the primary reflective surface 40. Accordingly, it is preferred that the light source 30 be disposed at the horizontal and vertical center of the primary reflective area 14, (i.e., on the optic axis of lens element 10) as an off center position can result in a portion of the primary reflective surface 40 being shaded by other areas of the primary reflective surface 40.

To facilitate the proper positioning of light source, or LED structure, 30 with respect to lens element 10, lens element 10 preferably includes mounting posts 64, 66 for aligning and positioning the lens element 10 with respect to the light source 30. LED structures, such as those preferably used in conjunction with the present invention, typically include indents 68 and 70 formed in the base portion 36 of the LED structure 30. (see FIGS. 2 and 4). Mounting posts 64, 66 extend from opposite sides of the input surface 12 from positions equidistant from the center thereof and are transversely centered with respect to the element 10. Posts 64 and 66 are spaced by a distance corresponding to the distance between inner-most portions of indents 68 and 70.

The lens element 10 and light source 30 are coupled with one another by inserting posts 64 and 66 into indents 68 and 70, respectively. Posts 64 and 66 are positioned and oriented so as to place the domed portion 38 in a centered position with respect to the primary reflective area 14 of the element 10. In other words, inserting the posts 64 and 66 into the indents 68 and 70 ensures that the LED structure 30 will be positioned on the optical axis of the bireflective lens element 10.

Two or more bireflective lens elements according to the present invention can be coupled with one another at their respective edges. A dual element optic structure is generally designated by reference number 80 in FIG. 7. Optic structure 80 includes a right bireflective lens element 82 and a left bireflective lens element 84.

Figure 7:
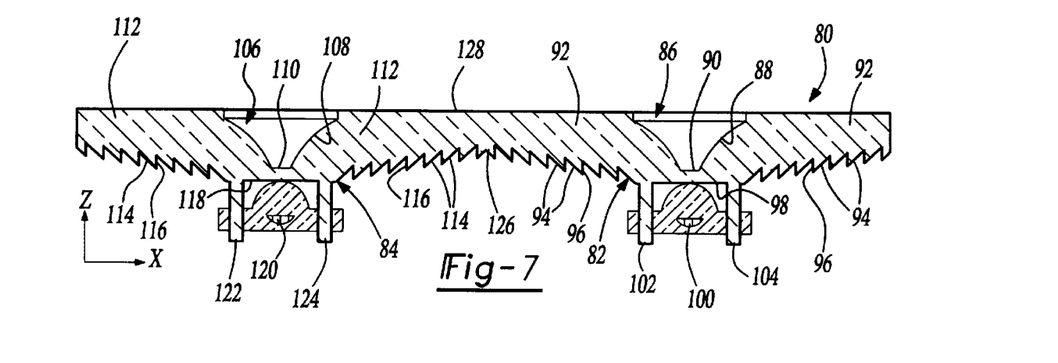
FIG. 7 is a longitudinal cross-section of a dual bireflective lens element optic structure.

Right bireflective lens element 82 includes a primary reflective area 86 having an associated primary reflective surface 88 and a direct transmitting area 90, a secondary reflective area 92 having a plurality of extracting facets 94 and associated step downs 96, and an input surface 98 with an associated light source 100 coupled with element 82 by mounting posts 102 and 104.

Similarly, left bireflective lens element 84 includes a primary reflective area 106 having an associated primary reflective surface 108 and a direct transmitting surface 110, a secondary reflective area 112 having a plurality of extracting facets 114 and associated step downs 116, and an input surface 118 with an associated light source 120 coupled with element 84 by mounting posts 122 and 124.

Right bireflective lens element 82 and left bireflective lens element 84 are joined together at a transition area 126 and define a common illumination surface 128. The left and right bireflective lens elements 82 and 84 could, however, be oriented such that their respective illumination surfaces are not coplanar with one another.

The bireflective lens element 10 of the present invention may be advantageously used in many applications in which surface illumination is required from a relatively thin profile optic structure. A bireflective lens element coupled with a light source, such as an LED, constitutes an example of the unit cell optics design approach whereby one or more optics structures and associated light sources (i.e., one or more unit cells) are constructed and arranged to accommodate lighting design requirements and/or packaging restrictions. The unit cell design approach is described in more detail in commonly owned U.S. patent application filed on Aug. 7, 1998 and entitled "Thin Light Managing System For Directing and Distributing Light From One or More Light Sources and Method For Making Optics Structures For Use in the System" the disclosure of which is hereby incorporated by reference.

Figure 6:
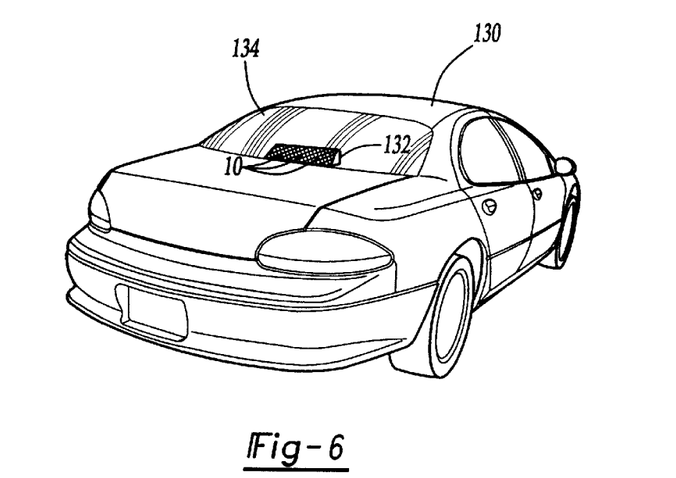
FIG. 6 is a partial perspective view of a rear window of a motor vehicle with a center high mounted stop lamp incorporating bireflective lens elements according the present invention.

In particular, a bireflective lens element may be used in various automotive signal lamp applications, for example, a center high mounted stop lamp ("CHMSL") or a rear combination lamp. As shown in FIG. 6, a motor vehicle 130 has a CHMSL 132 mounted in the rear window 134. The CHMSL shown incorporates twelve rectangular bireflective lens elements 10 with associated light sources (not shown) to effect an illumination signal lamp surface.

CHMSL 132 is shown mounted inside the rear window 134 on the back seat shelf. A CHMSL may, however, be mounted at a variety of locations on a vehicle, for example on the rear deck lid of the vehicle or on the roof of the vehicle. Bireflective lens elements may be incorporated into a CHMSL wherever it is mounted.

In addition, CHMSL 132 is shown with two rows of six lens element 10 stacked one above the other. Depending on the brightness of the individual light sources employed, more or less than twelve lens element/light source combinations may be used in the CHMSL. Also, the individual lens element/light source combinations may be arranged in different ways. For example, depending on styling requirements and/or vehicle packaging limitations, the CHMSL may comprise a single row of lens element/light source combinations, or it may comprise more than two rows of lens element/light source combinations.

Figure 8:
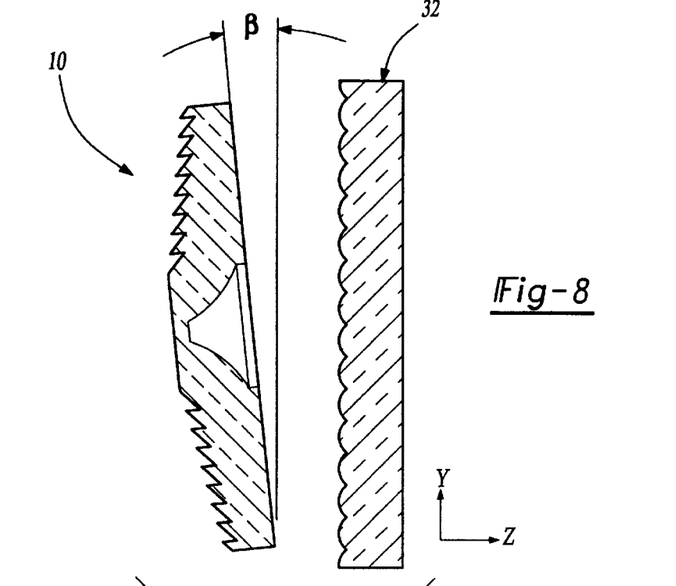
FIG. 8 is a transverse cross sectional view of a bireflective lens element according to the present invention in conjunction with a light spreading pillow lens showing the bireflective lens element tilted slightly with respect to the pillow lens.
Figure 12:
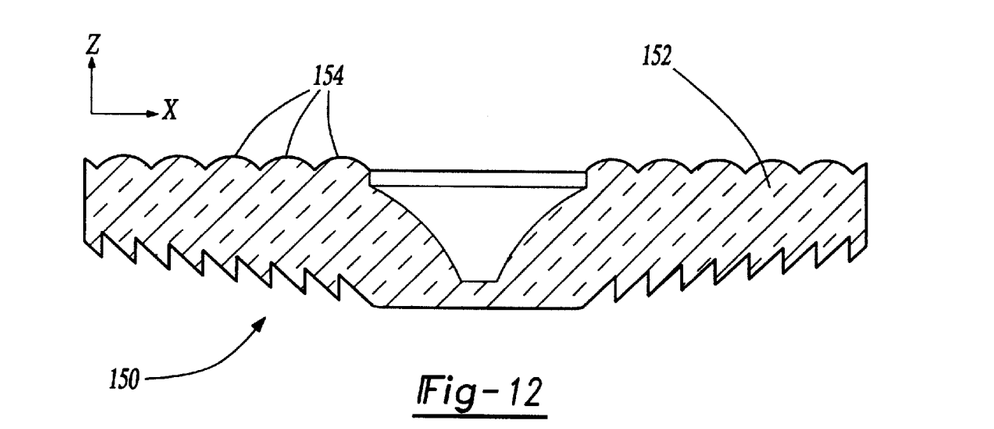
FIG. 12 is a longitudinal cross-section of yet another alternate embodiment of the bireflective lens element according to the present invention.

For a CHMSL, the bireflective lens element 10 may be coupled with light dispensing projections 32 positioned adjacent the illumination surface 20 for assisting in dispersing and redirecting the second portion of input light out of and/or back into the bireflective lens element 10 (see FIGS. 2, 8, and 12). Preferably, as shown in the FIGURES, the light dispersing projections 32 comprise a pillow lens element 32 having an array of pillows 136 formed on a input surface thereof. Federal traffic safety regulations require that a CHMSL be visible at points 10° left and right of the lamp and 10° above and 5° below the lamp. Accordingly, the pillow lenses 32 are specifically tailored to spread the light over this test point range. Other examples of light dispersing projections 32 may include an array of prisms and/or other geometrical shapes. In fact, the light dispersing projections 32 may be of any suitable shape or size so long as a sufficient amount of light is dispersed evenly out through the illumination surface 20 and/or redirected back into the lens element 10.

The pillow lens 32 may be tailored by varying the size of the individual pillows of the array of pillows 136 and by varying the vertical and horizontal radii of curvature of the individual pillows. Relatively small pillow lens optics are preferred as they will break up the partially collimated image of the bireflective lens element most effectively. In the preferred embodiment, the pillows are 2 mm square and have radii of curvature of 3.8 mm vertically and 2.4 mm horizontally. The parabolic equation for the surface of a pillow lens is as follows:

$$x = y^2/4.8 + z^2 7.6,$$

where,
    $|x| < 1$ mm
    $|z| < 1$ mm.

In addition, as shown in FIG. 8, to accommodate the asymmetric upper and lower visibility requirements, the bireflective lens element 10 may be tilted upwardly at an angle "β" of approximately 2.2° with respect to pillow lens array 32.

The bireflective and/or pillow, or other, lens elements can be similarly tailored to meet other desired light pattern designs or regional visibility requirements as well.

Through computer simulation, it was found that extracting facets 42 having a width of 1 mm or larger operate more efficiently than facets having a width of only 0.5 mm if a bend radius "R" (see FIG. 4) of 0.2 mm is assumed in the simulation. The bend radius "R" is a factor introduced into the simulation to account for manufacturing tolerances and the inability to mold perfectly sharp corners between the step downs 44 and the facets 42.

Variations of the basic bireflective lens element of FIG. 2 are shown in FIGS. 9 through 13.

Figure 9:
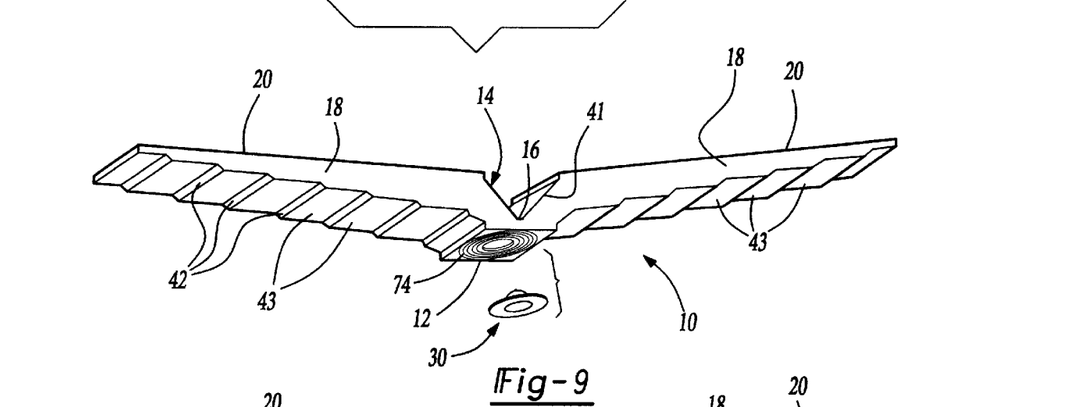
FIG. 9 is a perspective view of an alternative embodiment of the bireflective lens element according to the present invention.
Figure 10:
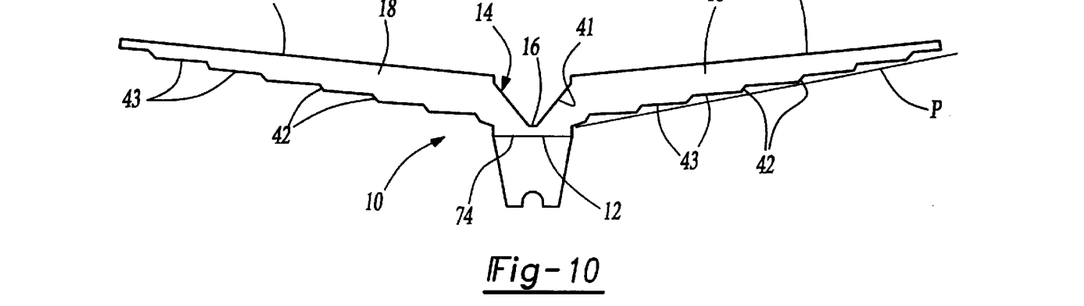
FIG. 10 is a side view of the alternative embodiment of FIG. 9.

FIGS. 9 and 10 disclose an alternative bireflective lens 10 having the flat planar surfaces 43 disposed between the facets 42 of the preferred embodiment. The primary reflective area 14 has a cone shaped surface 41 extending from the flat base area of the direct transmitting area 16 to the illumination surface 20. In addition, the secondary reflective areas 18 are angled slightly inward to form a concave lens element 10. Finally, a lens structure 74, such as a fresnel lens, is formed onto the input surface 12 for collimating light directly through the lens element 10.

Figure 5:
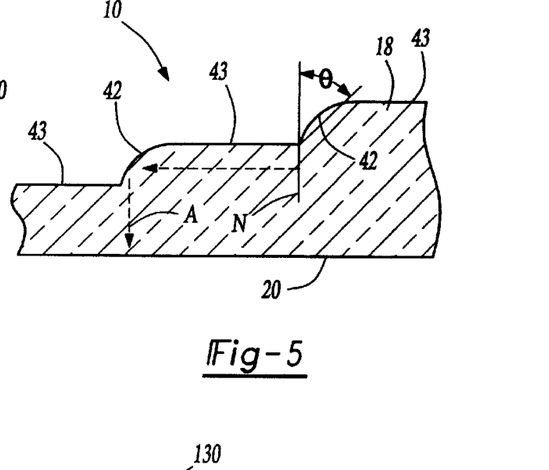
FIG. 5 is an exploded view of an alternative embodiment of the facets.

As best shown in FIG. 5, an alternative arrangement of facets are shown preferably including a reflective surface defining a compound curve for redirecting the light toward the illumination surface 20. As also shown in FIG. 5, the facets are spaced apart by adjacent flat planar surfaces 43. Alternatively, the extracting facets 42 and step downs 44 are shown in the preferred embodiment of FIGS. 2 and 3 as being flat and uniformly sized and spaced throughout the facet profile. The size, shape, and orientation of the facets and/or step downs may be varied to tailor the output light in accordance with particular illumination requirements. Reflectivity of the reflective surface 40 and facets 42 may also be enhanced by a reflective coating, such as vacuum deposited aluminum.

Figure 11:
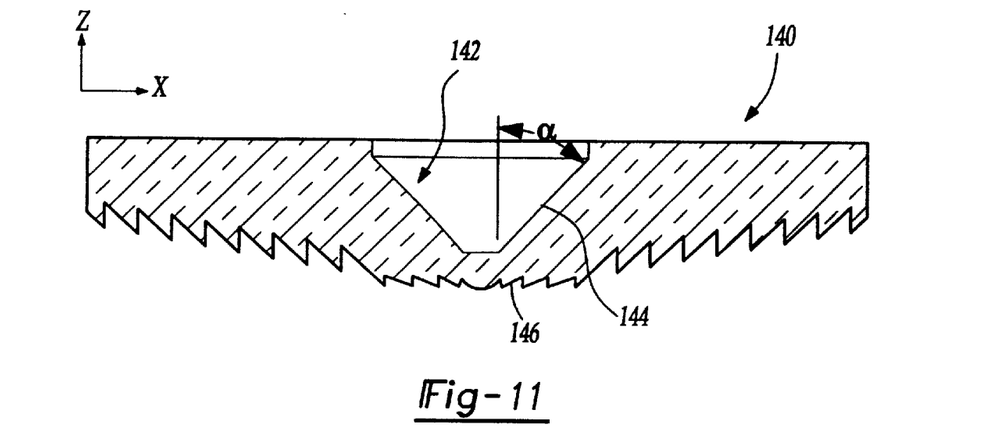
FIG. 11 is a longitudinal cross-section of another alternate embodiment of the bireflective lens element according to the present invention.

As shown in FIG. 11, lens element 140 includes a primary reflective area 142 with a primary reflective surface 144 that is not a revolved curved or generally parabolic shaped surface but is in the form of a straight cone of angle γ, for example 45°. In addition, the input surface 146 of element 140 is not a flat surface but is formed as a light conditioning optics surface, in the illustrated embodiment, a Fresnel surface.

In FIG. 12, lens element 150 includes an output surface 152 that is not flat, but includes an array of pillows 154 formed integrally with the element 150.

Figure 13:
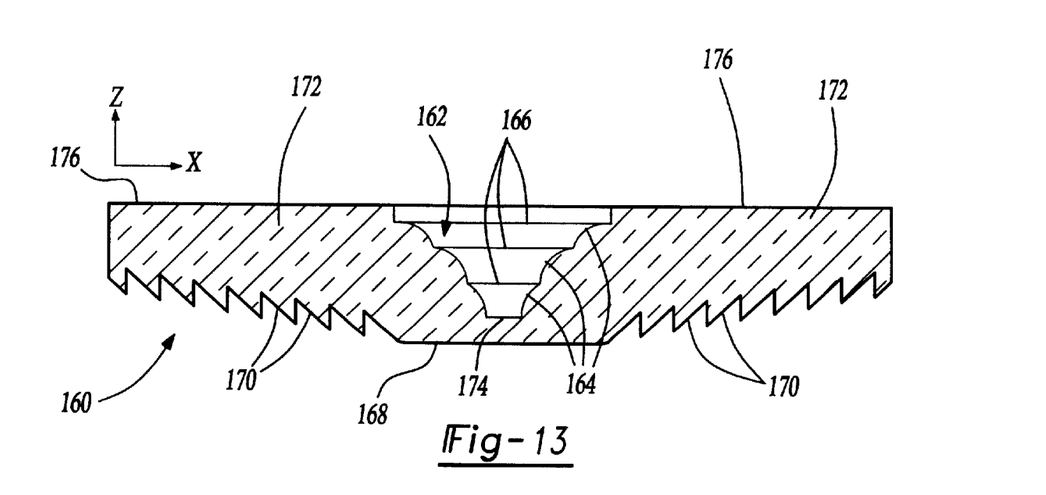
FIG. 13 is a longitudinal cross-section of another alternate embodiment of the bireflective lens element according to the present invention.

In FIG. 13, lens element 160 has a primary reflective area 162 which includes a plurality of primary reflective surfaces 164 to constitute revolved curved, or generally parabolic, shaped surfaces, separated by circumferential facets 166. The embodiment of FIG. 13 is another means by which light may be provided within the shadow cast by the primary reflective area 162.

Light from a light source (not shown) enters element 160 through input surface 168. A portion of the light is reflected by total internal reflection from the primary reflective surfaces 164 toward the extracting facets 170 of the secondary reflective area 172. Another portion of the input light is transmitted directly through the direct transmission area 174 and the facets 166 of the primary reflective area 162 toward the illumination surface 176.

Facets 166 are preferably substantially parallel to illumination surface 176 but may have an angled orientation to direct the light transmitted through the facet or a curved shape to spread or focus the light transmitted through the facet.

In addition, primary reflective surfaces 164 may be conical surfaces instead of curved surfaces.

The thin bireflective lens element of the present invention provides a number of advantages in addition to its ultra thin profile and design flexibility.

The bireflective lens element achieves surface illumination efficiently, that is with a limited number of light sources. Conventional attempts to increase the efficiency of a lighting system typically have involved secondary optical treatments, or components, such as reflective cones for capturing and focusing light from a light source. Providing such secondary treatment can increase cost and complexity due to the additional components and manufacturing steps required.

The bireflective lens element achieves efficient and uniform surface illumination over a broad area with only a single point light source and the lens element. Therefore, efficiency is improved while eliminating secondary optical treatments from the lighting system.

In addition, because secondary optical treatments, such as reflective cones, are typically not necessary with a bireflective lens element, the surface behind the lens elements may be visible through the illumination surface of the lens element when the light source is off. The ability to see through the lens element when the light source is off is beneficial in some styling scenarios where it is desirable to minimize the visibility of a light system employing bireflective lens elements when the light sources are off. Similarly, by providing a colored background behind the lens elements that is the same color as the structure surrounding the lighting system, it is possible to have the lighting system blend in with its surroundings when the light sources are off.

What is claimed is:

1. A bireflective lens element comprising:

a light input surface, a direct light transmitting area defining a first section of said lens element and communicating with said light input surface to direct a first portion of input light through said lens element in a first predetermined pattern illuminating said first section of said lens element, an illumination surface extending from said direct light transmitting area and substantially surrounding said direct light transmitting area to define a second section of said lens element, and a primary and a secondary reflecting area disposed between said light input surface and said illumination surface to redirect a second portion of input light through said lens element toward said illumination surface in a second predetermined pattern illuminating said second section of said lens element, wherein said first and second portions of the input light create uniform illumination over the lens element.

2. An assembly as set forth in claim 1 wherein said direct transmitting area comprises a substantially flat area defining a base of said primary reflective area.

3. An assembly as set forth in claim 2 wherein said flat area includes a lens for collimating light directly through said lens element.

4. An assembly as set forth in claim 2 wherein said primary reflective area comprises a substantially curved surface extending from said flat base area to said illumination surface for redirecting said second portion of input light from said light input surface toward said secondary reflecting area.

5. An assembly as set forth in claim 2 wherein said primary reflective area comprises a substantially cone shaped surface extending from said flat base area to said illumination surface for redirecting said second portion of input light from said light input surface toward said secondary reflecting area.

6. An assembly as set forth in claim 1 wherein said secondary reflective area includes a plurality of extracting facets extending inwardly into said secondary reflective area for intercepting said second portion of input light from said primary reflective area and redirecting said light toward said illumination surface.

7. An assembly as set forth in claim 6 wherein said facets are spaced apart by adjacent step downs which interconnect a trailing edge of a facet to a leading edge of an adjoining facet.

8. An assembly as set forth in claim 6 wherein said facets are spaced apart by adjacent flat planar surfaces.

9. An assembly as set forth in claim 6 wherein said facets include a substantially curved reflective surface for redirecting said second portion of input light toward said illumination surface.

10. An assembly as set forth in claim 6 wherein said secondary reflective area is substantially rectangular defining said front illumination surface and said facets are divided into discreet pie-shaped regions.

11. An assembly as set forth in claim 10 wherein said primary reflective area is centrally disposed within said rectangular secondary reflective area.

12. An assembly as set forth in claim 1 further including an array of light dispersing projections positioned adjacent said illumination surface for assisting in dispersing and redirecting said second portion of input light from said bireflective lens a element.

13. An assembly as set forth in claim 12 wherein said light dispersing projections comprise an array of pillow lenses for dispersing said input light.

14. An assembly as set forth in claim 13 wherein said lens element is tilted upwardly with respect to said pillow lenses.

15. An assembly as set forth in claim 13 wherein said pillow lenses are an integral part of said secondary reflective area thereby forming said illumination surface.

16. An assembly as set forth in claim 1 further including a transition area for joining two bireflective lens elements and creating a common illumination surface.

17. An assembly as set forth in claim 2 further including a plurality of primary reflective areas to constitute revolved curved surfaces separated by circumferential facets for redirecting said second portion of input light into said secondary reflective area.

18. A light emitting assembly for use in a vehicle comprising, a bireflective lens element including a light input surface and a light source adjacent to said light input surface for projecting light into said lens element, a direct light transmitting area defining a first section of said lens element and communicating with said light input surface to direct a first portion of input light through said lens element in a first predetermined pattern illuminating said first section of said lens element, an illumination surface extending from said direct light transmitting area and substantially surrounding said direct light transmitting area to define a second section of said lens element, and a primary and secondary reflective area disposed between said light input surface and said illumination surface to redirect a second portion of input light from said light input surface toward said illumination surface in a second predetermined pattern illuminating said second section of said lens element, wherein said first and second portions of said input light create uniform illumination over the lens element.

19. An assembly as set forth in claim 18 wherein said direct transmitting area comprises a substantially flat area defining a base of said primary reflective area.

20. An assembly as set forth in claim 19 wherein said primary reflective area comprises a substantially curved surface extending from said flat base area to said illumination surface for redirecting said second portion of input light from said light input surface toward said secondary reflecting area.

21. An assembly as set forth in claim 18 wherein said secondary reflective area includes a plurality of extracting facets extending inwardly into said secondary reflective area for intercepting said second portion of input light from said primary reflective area and redirecting said light toward said illumination surface.

22. An assembly as set forth in claim 21 wherein said facets include a substantially parabolic reflective surface for redirecting said second portion of input light toward said illumination surface.

23. An assembly as set forth in claim 18 further including an array of light dispersing projections positioned adjacent said illumination surface for assisting in dispersing and redirecting said second portion of input light from said bireflective lens element.

24. An assembly as set forth in claim 18 wherein said light source includes a light emitting diode.

25. An assembly as set forth in claim 24 further including mounting posts for aligning and positioning said lens element with respect to said light emitting diode.

26. A light emitting assembly for use in a vehicle comprising, a bireflective lens element including a primary reflective area and a secondary reflective area, said primary reflective area redirects light through said lens element and into said secondary reflective area in a predetermined pattern, said secondary reflective area includes a plurality of extracting facets extending inwardly into said secondary reflective area for intercepting light from said primary reflective area, and said facets each include a substantially curved surface for redirecting light from said primary reflective area outwardly away from said bireflective lens element to an illumination surface.

27. An assembly as set forth in claim 26 wherein said facets are spaced apart by adjacent step downs which interconnect a trailing edge of a facet to a leading edge of an adjoining facet.

28. An assembly as set forth in claim 26 wherein said facets are spaced apart by adjacent flat planar surfaces.

29. An assembly as set forth in claim 26 further including a direct transmitting area for directing light through said lens element in a predetermined pattern different from said pattern of said secondary reflective area.

30. An assembly as set forth in claim 29 wherein said direct transmitting area comprises a substantially flat area defining a base of said primary reflective area.

31. An assembly as set forth in claim 30 further including a light source adjacent to said flat area.

32. An assembly as set forth in claim 26 wherein said primary reflective area comprises a substantially curved surface extending from said flat base area to said illumination surface.

\* \* \* \* \*